US011197049B1

(12) United States Patent
Yang et al.

(10) Patent No.: US 11,197,049 B1
(45) Date of Patent: *Dec. 7, 2021

(54) DEVICES, SYSTEMS AND PROCESSES FOR FACILITATING SEAMLESS DIGITAL VIDEO RECORDING OF CONTENT AND USE THEREOF ACROSS MULTIPLE DEVICES WITHIN A LOCAL AREA NETWORK

(71) Applicant: DISH NETWORK L.L.C., Englewood, CO (US)

(72) Inventors: Yunfeng Yang, Aurora, CO (US); Mark John Sokald, Roxborough, CO (US); Jason Paul Carlson, Denver, CO (US); Seth Byerley, Parker, CO (US); Gowtham Ram Ramkumar, Englewood, CO (US); John Huynh, Thornton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/885,972

(22) Filed: May 28, 2020

(51) Int. Cl.
*H04N 21/266* (2011.01)
*H04N 21/482* (2011.01)
(Continued)

(52) U.S. Cl.
CPC . *H04N 21/26613* (2013.01); *H04N 21/25875* (2013.01); *H04N 21/278* (2013.01); *H04N 21/4821* (2013.01)

(58) Field of Classification Search
CPC ....... H04N 21/26613; H04N 21/25875; H04N 21/278; H04N 21/4821
(Continued)

(56) References Cited

U.S. PATENT DOCUMENTS 7,917,008 B1 * 3/2011 Lee .................... H04N 21/4583
386/291
8,798,444 B1 8/2014 Crandall
(Continued)

OTHER PUBLICATIONS

U.S. Appl. No. 16/886,073, filed May 28, 2020.
(Continued)

*Primary Examiner* — Dominic D Saltarelli
(74) *Attorney, Agent, or Firm* — Wash Park IP Ltd.; John T. Kennedy

(57) ABSTRACT

Systems, devices, and process described facilitate use of a first user device communicatively coupled to a local area network (LAN) The first user device may include a first hardware processor configured to execute first, non-transient, computer instructions for facilitating a first seamless DVR engine configured to identify a first content. A second user device is also coupled to the LAN. The second user device may include a second hardware processor configured to execute second, non-transient, computer instructions for facilitating a second seamless DVR configured to identify a second content. Each of the seamless DVR engines may be configured to generate a common universal directory identifying the first content and the second content as being available for use by each of the first user device and the second user device. User devices may independently populate the common universal directory. The universal directory may identify a distinct status for the content.

20 Claims, 6 Drawing Sheets

(51) Int. Cl.
*H04N 21/258* (2011.01)
*H04N 21/278* (2011.01)

(58) Field of Classification Search
USPC .......................................................... 725/31
See application file for complete search history.

(56) References Cited

U.S. PATENT DOCUMENTS

| | | |
|---|---|---|
| 2008/0059884 A1 | 3/2008 | Ellis et al. |
| 2008/0155618 A1 | 6/2008 | Grady et al. |
| 2008/0232312 A1 | 9/2008 | Roh et al. |
| 2008/0273856 A1 | 11/2008 | Bumgardner et al. |
| 2008/0282312 A1 | 11/2008 | Blinnikka |
| 2009/0210533 A1 | 8/2009 | Verhaegh et al. |
| 2014/0281489 A1 * | 9/2014 | Peterka ............... H04W 4/18 713/153 |
| 2015/0052568 A1 | 2/2015 | Glennon |
| 2015/0195476 A1 | 7/2015 | Hieb |

OTHER PUBLICATIONS

U.S. Appl. No. 16/886,190, filed May 28, 2020.
U.S. Appl. No. 16/886,190, Non-final Office Action, dated Feb. 4, 2021.
U.S. Appl. No. 16/886,073, Application as filed, filed May 28, 2020.
U.S. Appl. No. 16/886,190, Application as filed, filed May 28, 2020.
U.S. Appl. No. 16/886,073, Non-Final Office Action, dated Mar. 24, 2021.
U.S. Appl. No. 16/886,073, Response to Non-Final Office Action, dated May 20, 2021.
U.S. Appl. No. 16/886,073, Notice of Allowance, dated Jun. 14, 2021.
U.S. Appl. No. 16/886,190, Non-final Office Action Response, dated May 20, 2021.
U.S. Appl. No. 16/886,190, Notice of Allowance, dated Sep. 7, 2021.
U.S. Appl. No. 17/470,086, Application as filed, Sep. 9, 2021.

* cited by examiner

DEVICE (A) DIRECTORY

| SOURCE | DRM KEY | TITLE | USER |
|---|---|---|---|
| DISH | K1 | CHICAGO FIRE | DAVID |
| NETFLIX | K1 | HAPPY DAYS | HARRY |
| DISNEY | K3 | STAR WARS E.9 | LEA |
| NETFLIX | K1 | GONG SHOW | RICH |
| DISH | K1 | STAR TREK E.2 | SPOK |

DEVICE (B) DIRECTORY

| SOURCE | DRM KEY | TITLE | USER |
|---|---|---|---|
| NETFLIX | K2 | MARY POPPINS | JULIE |
| DISH | K1 | DUMBO | TIM |
| DISH | K1 | THE LION KING | MATTHEW |
| DISNEY | K3 | STAR TREK E.10 | JEAN LUKE |

DEVICE (C) DIRECTORY

| SOURCE | DRM KEY | TITLE | USER |
|---|---|---|---|
| DISH | K1 | STAR TREK E.2 | JAMES T. |
| DISH | K1 | LOST | J.J. |
| DISNEY | K3 | THE MATRIX | KEANO |

FIG. 2A

UNIVERSAL DIRECTORY

| DEVICE | SOURCE | DRM KEY | TITLE | USER | BASIS | STATUS |
|---|---|---|---|---|---|---|
| 106(A) | DISH | K1 | CHICAGO FIRE | DAVID | INCLUDED | AVAILABLE |
| 106(A) | NETFLIX | K1 | HAPPY DAYS | LEA | INCLUDED | B – PLAYING |
| 106(A) | DISNEY | K3 | STAR WARS E.9 | RICH | K3 RQ'D | KEY LIMIT EXCEEDED |
| 106(A) | NETFLIX | K1 | THE GONG SHOW | SPOK | INCLUDED | AVAILABLE |
| 106(A) | DISH | K1 | *STAR TREK E.2* | JULIE | *INCLUDED* | A - PLAYING |
| 106(B) | NETFLIX | K2 | MARY POPPINS | BRIAN | K2 RQ'D | K2 LINK AVAILABLE |
| 106(B) | DISH | K1 | DUMBO | TIM | INCLUDED | AVAILABLE |
| 106(A) | DISH | K1 | THE LION KING | HARRY | INCLUDED | AVAILABLE |
| 106(B) | DISNEY | K3 | *STAR TREK E.10* | MATTHEW | K3 RQ'D | RECEIVER RQ'D |
| *106(N)* | NETFLIX | K2 | *MISSION IMPOSS. 7* | TOM | INCLUDED | B-PLAYING |
| *106(N)* | DISH | K1 | *STAR TREK E. 3* | JEAN L. | INCLUDED | N-PLAYING |

FIG. 2D

DEVICES, SYSTEMS AND PROCESSES FOR FACILITATING SEAMLESS DIGITAL VIDEO RECORDING OF CONTENT AND USE THEREOF ACROSS MULTIPLE DEVICES WITHIN A LOCAL AREA NETWORK

CROSS REFERENCE TO RELATED APPLICATIONS

The present application relates to co-pending U.S. application Ser. No. 16/86,073, which was co-filed herewith on May 28, 2020, in the name of inventors Yunfeng Yang, John Huynh, Gowtham Ramkumar, Mark Sokald, Jason Carlson and Seth Byerley, is entitled "DEVICES, SYSTEMS AND PROCESSES FOR FACILITATING SEAMLESS USE OF TUNERS ACROSS MULTIPLE DEVICES WITHIN A LOCAL AREA NETWORK" (herein, "Seamless Tuners"). The present application also relates to co-pending U.S. application Ser. No. 16/886,190, which was co-filed herewith on May 28, 2020, in the name of inventors Jason Carlson, John Huynh and Yunfeng Yang, is entitled "DEVICES, SYSTEMS AND PROCESSES FOR FACILITATING SEAMLESS USE OF TIMERS ACROSS MULTIPLE DEVICES WITHIN A LOCAL AREA NETWORK" (herein, "Seamless Timers"). The entire contents of each of the above identified applications are incorporated herein by reference.

TECHNICAL FIELD

The technology described herein generally relates to devices, systems, and processes for facilitating digital video recording of content using multiple devices. The technology described herein also generally relates to the use of multiple digital video recorders to facilitate recordings of multiple contents streams across a local area network. The technology described herein also generally relates to the allocation of scarce resources across a local area network to facilitate the recording of multiple content streams wherein, absent such allocation of recording resources, the recording of certain content streams would not be achievable.

BACKGROUND

Today, users commonly use storage devices, such as digital video recorders ("DVRs") to store various forms of digitally encoded content. Such content may include video programs, television shows, movies, video clips, and the like, audio programs, and other forms of content. Often multiple users are associated together, such as members of a family, or other localized group of individuals. Such associations of user are each referred to herein as being within a "household." Users in such households often desire to record and view, often at a later time, given instances of content, such as a specific episode of a television show, a movie, or other content; such specific instances of content each being identifiable herein by a "title." Yet and despite the association of two or more users in a household, each user of a household commonly is required, with respect to their DVR, to store a separate instance of a given title. For example, a first user in a given household desiring to store and later playback an instance of a show is commonly required to store that content on their DVR in order to be able to view it later. Likewise, a second user in a given household desiring to store and later playback the same content is also commonly required today to store such content on their separate DVR. Accordingly, multiple copies of a given content are often stored on multiple DVRs within a household. Further, a recording of a given content will often occur even when such content has already been stored on another DVR within a given household. It is to be appreciated that such practices are wasteful of often limited, if not scarce, storage resources and other content accessing resources, such as tuners, receivers, and the like. Accordingly, devices, systems, and methods for addressing these and other concerns are needed.

SUMMARY

The various embodiments of the present disclosure relate in general to devices, systems, and processes for facilitating seamless digital video recordings of content and use thereof across multiple devices within a local area network. In accordance with at least one embodiment of the present disclosure, a system for facilitating seamless digital video recordings of content may include a first user device communicatively coupled to a local area network. For at least one embodiment, the first user device may include a first hardware processor configured to execute first, non-transient, computer instructions for facilitating a first seamless DVR engine. The first seamless DVR engine may be configured to identify a first content. The system may further include a second user device communicatively coupled to the local area network. The second user device may include a second hardware processor configured to execute second, non-transient, computer instructions for facilitating a second seamless DVR engine. The second seamless DVR engine may be configured to identify a second content. For at least one embodiment, each of the first seamless DVR engine and the second seamless DVR engine may be further configured to generate a common universal directory identifying each of the first content and the second content as being available for use by each of the first user device and the second user device.

For at least one embodiment, each user device may be configured to independently populate the common universal directory.

For at least one embodiment, the system may include a third user device communicatively coupled to the local area network. The third user device may include a third hardware processor configured to execute third, non-transient, computer instructions for facilitating a third seamless DVR engine. The third seamless DVR engine may be configured to identify a third content. The common universal directory may identify the third content as being available for use by at least one of the first user device and the second user device. For at least one embodiment, the common universal directory may identify a distinct status for the first content.

For at least one embodiment, the distinct status may include one of playing on the first user device, playing on the second user device, and playing on the third user device. For at least one embodiment, the first computer instructions may inhibit deletion of the first content when the distinct status is one of playing on the second user device and playing on the third user device.

For at least one embodiment, the first user device may include a first storage module that includes a first content database configured to store the first content. The first content may be identified by a first title. The second user device may include a second storage module that includes a second content database configured to store the second content. The second content may be identified by a second title. Each a first universal directory and a second universal directory may be provided which identify each of the first content and the second content, respectively, by the first title and the second title. Each of the first universal directory and the second universal directory may provide unique combinations of content identifiable from the common universal directory.

For at least one embodiment, a use of the first content and the second content, by one or more of the first user device and the second user device, requires access to a common DRM key. For at least one embodiment, the common DRM key is a household key; and wherein each of the first user device and the second user device are associated with a given household.

For at least one embodiment, the first user device further may include a first receiver module configured to receive the first content from a first content source. The first content source may be at least one of a cable, satellite, Internet, streaming, over the air, and an over the top content source.

For at least one embodiment, the first user device may include a first storage module configured to store information in at least one of a content database, a user database, a history database, and a support database. For at least one embodiment, the first computer instructions may be configured to instruct the first seamless DVR engine to populate a first universal directory, based on the common universal directory, in view of a user preference provided in the user database.

For at least one embodiment, a user preference may indicate a preference, by a first user, for sporting event related content. The first seamless DVR engine may be configured to populate the first universal directory by extracting, from the common universal directory, sporting event related content and excluding non-sporting event related content.

In accordance with at least one embodiment of the present disclosure a process for facilitating seamless digital video recording and use of content across multiple devices within a local area network may include the operations of initiating by a first user device on a local area network (LAN) a discovery for available devices. The operations may also include receiving, from a second user device on the LAN an available signal response. The operations may also include determining whether the second user device is permitted to participate in a session. The session may include a sharing of DVR content by a source user device with a destination user device. If the second user device is permitted to participate in a session, the process may include publishing, by the second user device, a second content directory on the LAN and publishing, by the first user device, a first content directory on the LAN. The process may include generating a common universal directory based on content identified in the published first content directory and in the published second content directory.

For at least one embodiment, the process may include launching and conducting a session by providing access by the source user device to the destination user device. The source user device may be one of the first user device and the second user device and the destination user device may be the respective opposite of the first user device and the second user device.

For at least one embodiment, the common universal directory may be generated separately by each of the first user device and the second user device.

For at least one embodiment, the process may include receiving, from a third user device on the LAN another available signal response. The process may include determining whether the third user device is permitted to participate in the session. If the third user device is permitted to participate in the session, the process may include one or more of: publishing, by the third user device, a third content directory on the LAN; publishing, by the first user device, a republished first content directory on the LAN; publishing, by the second user device, a republished second content directory on the LAN; and generating a second common universal directory based on content identified in the republished first content directory, in the republished second content directory, and in the third content directory.

For at least one embodiment, the republished first content directory may differ from the first content directory.

For at least one embodiment, the process may include determining whether at least two of the first user device, the second user device and the third user device are permitted to participate in a second session.

In accordance with at least one embodiment of the present disclosure, a user device may be configured for use in facilitating seamless DVR recording and use of content across multiple devices within a local area network. For at least one embodiment, the user device may include a hardware processor configured to execute non-transient computer instructions for facilitating a seamless DVR engine. The user device may include a storage module for storing content. The user device may include an interface module configured to communicatively couple the user device with a second user device over a local area network (LAN). The user device may include a security module configured for use in encrypting and decrypting the content and securely communicating the content, in an encrypted form, to the second user device. The user device may include a receiver module for receiving the content from a content source. For at least one embodiment, the seamless DVR engine may be configured to facilitate operations including one or more of generating a universal directory identifying to the second user device the stored content on the first user device; and establishing a session between the first user device and the second user device, via the LAN. For at least one embodiment and during the session, the second user device can access the stored content on the first user device identified by the universal directory.

For at least one embodiment, the storage module may include a first user database. For at least one embodiment and during a second session, the first user device may be configured to populate a first universal directory based upon a second content stored on the second user device and identified in the universal directory and at least one user preference provided in the first user database.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

FIG. 2A is an illustrative representation of multiple instances of content separately stored on multiple DVRs within a household and in accordance with use of at least one embodiment of the present disclosure to facilitate seamless digital video recordings of content and use thereof across multiple devices within a local area network.

FIG. 2D is an illustrative representation of a universal directory that has been populated to include a status indicator for a given content and in accordance with use of at least one embodiment of the present disclosure to facilitate seamless digital video recordings of content and use thereof across multiple devices within a local area network.

DETAILED DESCRIPTION

The various embodiments described herein are directed to devices, systems, and processes for facilitating seamless digital video recording of content and use thereof across multiple devices within a local area network.

Figure 1:
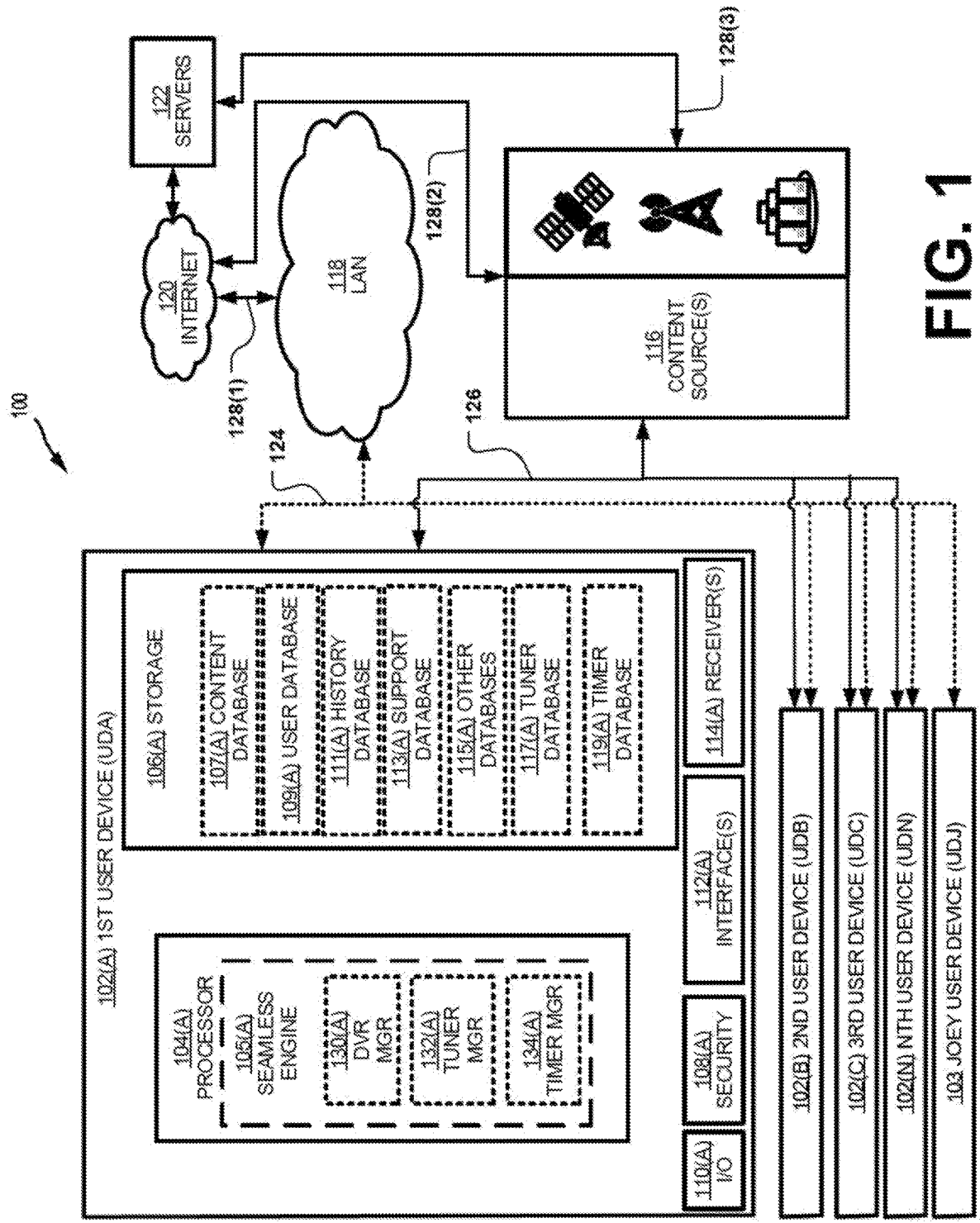
FIG. 1 is a schematic diagram of a system configured in accordance with at least one embodiment of the present disclosure to facilitate seamless digital video recording of content and use thereof across multiple devices within a local area network.

As shown in FIG. 1, and as briefly discussed above, each user of a household commonly is associated with one or more user devices, such as user devices 102(A), 102(B) and 102(N) (herein, the "(A)," "(B)," and "(N)" indicate unique user devices). Each of the user devices may be the same type of device or different. Non-limiting examples of user devices include cable/satellite set-top boxes, smart televisions, streaming devices, laptop and desktop computers, table computing devices, smartphones, gaming consoles, and otherwise. Each user device 102 commonly includes a processor module 104, a storage module 106, a security module 108, an input/output ("I/O") module 110, one or more interface modules 112, such as a local area network ("LAN") interface, and one or more receiver modules 114. Each of these components are further discussed below. Additional components may be used in any given user device and a component may be provided as integrated into a given user device, directly coupled to a given user device, indirectly coupled to a given user device, or otherwise communicatively and/or operationally coupled to a given user device. One or more less capable devices (which are referred to herein as "Joeys") 103 may also be used in a given system 100. For at least one embodiment, a Joey 103 differs, at a minimum, from a user device 102 by not having one or more receivers 114. Accordingly, a Joey 103 is typically configured to utilize a receiver 114 provided in a user device 102 for reception and signal processing of content provided by a content source 116.

Each user device 102 provides a user thereof with access to a digital storage device, such as a DVR. The DVR may be provided by the corresponding storage module 106, and controlled by and/or accessed using one or more other user device components, such as the I/O module 110. For a Joey 103, DVR functions may be provided by, and accessible using, a linked main/master user device 102.

As further shown in FIG. 1, the various user devices 102(A)-102(N) may be communicatively coupled to one or more content sources 116 by one or more receiver links 126. Non-limiting examples of such content sources include satellite distribution services, such as those provided by DIRECTV, DISH and others, cable system providers, such as those provided by COX, XFINITY, and others, terrestrial content broadcasters, such as those provided by local television stations within one or more defined areas, streaming/on-line content system providers, such as NETFLIX, SLING TV, HULU, YOUTUBE, DISNEY+, HBO NOW, other over the top sources, and other sources. It is to be appreciated that a given user device 102 may be configured to receive content on a demand, request, scheduled, or other basis. A given user device 102 may be configured to receive content from multiple content sources and store one or more instances of such content in the storage module 106. Such content may be identified by a source, title and/or program ID and may require use of certain encryption and/or digital rights management ("DRM") keys and/or profiles to decrypt, present, and otherwise access.

The receiver links 126 may use any form and/or combination of any known and/or later arising wired, wireless and/or combinations thereof communications technologies; non-limiting examples include WIFI, Ethernet, coaxial cables, CAT 5/6 cabling, BLUETOOTH, fiber optic cables, and others. A household may be configured to provide a single content source node, such as and not by limitation, a satellite television antenna and receiver, by which user devices 102 within the household may be coupled to one or more content sources. Such content source nodes are well known in the art. Other examples of content source nodes may include routers, gateways, and other devices.

As further shown in FIG. 1, each of the user devices 102 and Joeys 103 may be communicatively coupled to a LAN 118 by one or more internal links 124. For at least one embodiment, the LAN 118 may be configured for use within a single household. For other embodiments, the LAN 118 may be configured for use with two or more households, as may arise in a multi-unit dwelling. When two or more household are communicatively coupled using the LAN 118, as desired, appropriate firewalls and other logical and/or physical separations may be provided between such households. The internal links 124 may use any desired known and/or later arising wired, wireless and/or combinations thereof communications and network technologies; non-limiting examples include WIFI, Ethernet, coaxial cables, CAT 5/6 cabling, BLUETOOTH, fiber optic cables, and others. As discussed further below, the LAN 118 provides a communications pathway by which the various user devices 102 within a household, at any given time communicate. The LAN 118 may have a name or SSID associated with it. Such name may hidden or publicly detected, identified.

Using the LAN 118, a common universal directory of recorded content across two or more user devices 102 connected thereto within a given household may be populated. Such populated content may be seamlessly accessible by one or more of the user devices 102, even when such content is not directly stored using a storage module 106 provided by that given user device 102. That is, for at least one embodiment, content populated onto a universal directory from multiple user devices 102 may be shared and accessible by and between two or more of the various user devices 102 then communicatively coupled to a given LAN 118, where each such user device 102 is configured to facilitate seamless DVR content sharing over that LAN 118.

As discussed above and for at least one embodiment, access to the LAN 118 may be limited to members (user devices 102 and/or Joeys 103) associated with a given household. Such access may be limited using any known or later arising network access control technologies. Non-limiting examples of such access control technologies include the use of passwords, MAC address listings, and others. For another embodiment, access to the LAN 118 may be open to user devices not associated with a given household. It is to be appreciated that when user devices are external to a given household additional and/or different DRM protocols may be used and/or required with respect to all and/or some of the content identified on a universal directory.

For at least one embodiment, the internal links 124 may use any currently known or later arising communications and/or networking technologies. For at least one embodiment, the internal links 124 may be established using peer-to-peer communications technologies. For at least one embodiment, the internal links 124 may use a hub and spoke configuration, with a router of other device facilitating formation of the LAN 118.

For at least one embodiment, the LAN 118 may be self-forming. Self-formation of the LAN 118 may arise when a user device 102 known to be associated with a member/user of a household (or other approved collection of user and their associated user devices), communicatively enters into, by change of physical location, powering on, turning of a networking interface element or otherwise, an area in which a LAN 118 is formed or is to be formed. For example, upon entry of a second user device 102(B) into an area, such as a house, containing a first user device 102(A), the second user device 102(B) may announce its presence to a wireless router, such as a WIFI router, to which the first user device 102(A) is already communicatively coupled. Each of the first user device 102(A) and the second user device 102(B), and/or any other user devices then connected to the LAN 118 and desiring to participate in a universal directory service facilitated over such LAN 118, may be configured to initiate a discovery and LAN formation process between the first user device 102(A), the second user device 102(B) and any other user devices 102(N). Such LAN 118, as discussed below, may be used to facilitate seamless digital video recording, and sharing of DVR content across the LAN 118 and amongst and between first user device 102(A), the second user device 102(B) and any other so communicatively coupled other user devices 102(N).

Similarly, a third user device 102(C) may communicatively enter an area wherein the LAN 118 already exists for at least purposes of seamless DVR use between the first user device 102(A) and the second user device 102(B). Upon the third user device 102(C) announcing its presence, one or more of the first and/or second user devices 102(A)/(B), if not both, may accept entry of the third user device 102(C) onto the LAN 118. Such LAN entry may provide for a limited entry privileges, full entry privileges, or otherwise to the third user device 102(C).

For example, entry privileges may be used to determine which DVR content a given user device, such as the third user device 102(C) may be permitted to access, which DVR content stored by certain, if not all, other user devices 102 are identifiable to the third user device 102(C), which of the third user device's stored content is discoverable to other user devices 102 and/or Joeys 103, which of any other user devices 102 and/or Joeys 103 may access content stored by the third user device 102(C), and otherwise. It is to be appreciated, that such privileges may be provided and/or not provided in view of one or more considerations including, but not limited to, digital rights management ("DRM") restrictions, parental control settings, and otherwise. For at least one embodiment, each user device 102 and Joey 103 participating in the LAN 118, for at least seamless DVR purposes, may be populated with a same, unique, or some permutation thereof, universal directory of DVR content accessible via the LAN 118. For at least one embodiment, a first universal directory available to a first user device 102(A), may vary from a second universal directory available to a second user device 102(B), and the like.

As further shown in FIG. 1 and for at least one embodiment, the LAN 118, content sources 116 and servers 122 may be communicatively coupled, via the Internet 120, directly, via or other wide area networks and/or communications technologies, services and/or systems, or otherwise, by one or more external links, such as external links 128(1)-128(3). It is to be appreciated that the Internet 120 may provide access by one or more of the user devices 102, Joeys 103, content sources 116, LAN 118, and the like to one or more servers 122. Such servers 122 may be used in providing given content, authenticating access to a given content, or otherwise. The external links 128 may use any known or later arising communications and/or networking technologies. For at least one embodiment, one or more external net links may be established using common cellular communications technologies including, but not limited to, 3G/4G/5G technologies. For at least one embodiment, one or more external links 128 may be established using any desired communications technology of which non-limiting examples include Ethernet, the Internet, private networks, public networks, the plain old telephone service (POTS), microwave links, fiber-optics, wireless, wired, cellular, other networking communications technologies, and/or combinations thereof.

Processor Module (104)

Referring again to FIG. 1, a user device 102 may include one or more processor modules 104 configured to provide computer implemented software and hardware engines including, at least, a seamless engine 105. Other computer implemented engines may be provided for other embodiments.

The processor module 104 may be configured to provide any desired data and/or signal processing capabilities. For at least one embodiment, the processor module 104 may have access to one or more non-transitory processor readable instructions, including instructions for executing one or more applications, engines, and/or processes configured to instruct the processor to perform computer executable operations (hereafter, "computer instructions"). The processor module 104 may use any known or later arising processor capable of providing and/or supporting the features and functions of a given user device as needed for any given intended use thereof and in accordance with one or more of the various embodiments of the present disclosure.

For at least one non-limiting embodiment, the processor module 104 may be configured as and/or has the capabilities of a 32-bit or 64-bit, multi-core ARM based processor. For at least one embodiment, the processor module 104 may use, in whole or in part, one or more backend systems, such as server systems or otherwise. Computer instructions may include firmware and software instructions, and associated data for use in operating a given user device 102, as executed by the processor module 104. Such computer instructions provide computer executable operations that facilitate one or more features or functions of a given user device 102 and in accordance with one or more embodiments of the present disclosure.

Seamless Engine (105)

For at least one embodiment, the processor module 104 may be configured to implement computer instructions for configuring a user device to function as a seamless DVR. To facilitate such functionality, computer instructions for facilitating a seamless engine 105 may be executed by the processor module 104. For at least one embodiment, the seamless engine 105 may be executed by each processor module 104 for those user devices participating on a given LAN 118. The seamless engine 105 may be a combination of a hardware processor and computer instructions. In other embodiments, the seamless engine 105 may be implemented by a dedicated or separate processing component. The seamless engine 105 may be configured to provide a given user device 102 with capabilities of designating, defining, generating, managing, manipulating, accessing, and/or providing seamless DVR content between two or more user devices 102 on a LAN 118.

The seamless engine 105 may be configured to permit certain known, discoverable, unknown, or other user devices 102 to join in a given LAN 118 such that DVR content on such user devices 102 may be seamlessly accessed by and between the various user devices 102 on the LAN 118. As discussed above, for at least one embodiment, access to the LAN 118 may be limited to members of a household and/or other authorized users.

For at least one embodiment, the seamless engine 105 may be configured to facilitate the seamless sharing of DVR content on a LAN 118, a given user device 102, such as a first user device 102(A), may be designated as a "master" of the DVR content and one or more other user devices, such as a second user device 102(B), may be designated as a "remote"—an STB by which the seamless DVR content, at a given time, may be accessed. It is to be appreciated that DVR content stored on a given user device is typically accessible by such user device. However, for at least one embodiment, content stored on a given user device may be designated to be accessible, by default, by the user device requesting storage of such content; such requesting user device may or may not be the same as the user device on which such content is actually stored.

For at least one embodiment, the seamless engine 105 may be configured to facilitate varying roles. That is, a role designated by a given user device with respect to a given stored content may vary over time. Further, such roles may coexist with two or more user devices, for example, with each user device being designated as separate destinations for a given content, or otherwise. For at least one embodiment, at any given time a user device's roles (e.g., as a source or destination of DVR content) may vary over time, such that a given first user device 102(A) may be a source providing content stored on its storage module 106(A) with one or more second user devices 102(B)-102(N), while the first user device 102(A) is a destination accessing content stored on one of the second or other user devices 102(B)-102(N).

For at least one embodiment, the seamless engine 105 may be configured to facilitate a given role of a user device 102 with respect to a given content as being associated with a given "session." More specifically and for at least one embodiment, a session is a process, executed by one or more user devices 102, wherein a given content, received previously or at that time from a given content source 116, is designated for access by a "destination" (or "remote") user device from a "source" (or "master") user device. The source user device being the device at which the given content has been or then is being stored. For instances where the content is stored and to be presented by the same user device, the source and the destination identifiers may be the same user device.

It is to be appreciated that for at least one embodiment, the seamless engine 105 may be configured to facilitate multiple, simultaneous sessions with respect to a given content and a source thereof. For example, when a first user device 102(A) is a source of a given content, each of a second and third user devices 102(B)/(C) may each be designated as destinations for such given content. Separate sessions may be instantiated for each such designations.

Further and for at least one embodiment, the seamless engine 105 may be configured to facilitate synchronization between two or more sessions, as desired. For at least one embodiment, a providing of the given content by the first user device 102(A), the "source", to each of the second and third user devices 102(B)/(C), the "destinations", may be time synchronized such that users of the second and third user devices 102(B)/(C) are substantially simultaneously presented with the given content. For another embodiment, such synchronization may not be provided.

For at least one embodiment, the seamless engine 105 may be configured to facilitate user devices on the LAN 118 being able to utilize storage capabilities of another user device to store content. For example, a first storage module 106(A) may have limited storage capability or capacity, at a given time, while a second storage module 106(B), on a second user device 102(B), may have the needed capacity and/or capabilities. Accordingly, the first user device 102(A) may utilize, over the LAN 118, the storage capabilities of the second user device 102(B) on an as needed, as desired, as permitted, or other basis.

For at least one embodiment, the seamless engine 105 may execute on a user device 102 configured to operate as a hub and spoke which facilitates communications between a first user device 102(A) and one or more second user devices 102(B)-102(N) over a then arising LAN 118. More specifically, one of the user devices 102 may be configured to operate its seamless engine 105 in a "master" mode, while other user devices on the LAN 118 may be configured to operate their seamless engine 105 in a "subordinate" or "remote" mode. In other embodiments, each seamless engine 105 may be configured to operate, independently, in a master mode, with any conflicts arising between respective user devices 102 being resolved in view of one or more conflict roles and/or algorithms executed by the seamless engine 105.

For at least one embodiment, a seamless engine 105 may be configured to identify available and acceptable user devices 102 and/or Joeys 103 for coupling together on a formed or to be formed LAN 118. Such identification may be based upon relationship information stored in a storage device 112, such as an account identifier, where, for example and not by limitation, each user device 102 and/or Joey 103 configured for use on a given LAN 118 is associated with a household identifier. User devices 102 and/or Joeys 103 not so associated with a given household identifier, such as those provided in another unit of a multi-unit dwelling, may not be configurable for use on a given LAN 118 for a given household. For at least one embodiment, household relationship information may be provided to each user device 102 using any known or later arising communications technologies. For at least one embodiment, one or more smart cards, processes, modules, or the like for the security module 108, in a given user device, may be configured to include such household identifier.

For at least one embodiment, a seamless engine 105 may be configured to invite and/or accept other user devices 102 and/or Joeys 103 into a given LAN 118, for accessing DVR content provided by one or more other user devices on the LAN, based upon one or more criteria and/or corresponding settings. One non-limiting example of a criteria may include whether a given user device 102 and/or Joey 103 is permitted to access content in one or more rating and/or parental control classifications, such as PG-13, R, or otherwise. Another non-limiting example of a criteria may include whether a given user device 102 and/or Joey 103 is permitted to access content within certain time periods, such as late night, or otherwise. Another non-limiting example of a criteria may include whether a given user device 102 and/or Joey 103 is permitted to access content having a limited use, payment, or other criteria.

For at least one embodiment, the seamless engine 105 may be configured to facilitate control of access to DVR content on a LAN 118 by use of other forms of access criteria such as passcodes, security keys, or other information. For at least one embodiment, a seamless engine 105 may be configured to accept any user device 102 and/or Joey 103 within range thereof and/or satisfying/over-coming one or more access criteria.

For at least one embodiment, the seamless engine 105 may be configured to facilitate formation of multiple seamless DVR sessions between multiple user devices 102 and/or user device 102 and a Joey 103, on a given LAN 118. For example, a first seamless DVR session may permit access to any DVR content on a first user device 102(A) on the LAN 118, while a second seamless DVR session may permit access, by a subset, but not all, of the user devices 102(N) and/or Joeys 103 on the LAN 118 to the content on the first user device 102(A).

For at least one embodiment, the seamless engine 105 may be configured to facilitate private, seamless DVR sessions. For a private session, participation in the session may be limited to a selected group of user devices 102 and/or Joeys 103. That is, content provided by use of a given tuner may be multi-cast to one or more user devices 102 and/or Joeys 103. For at least one embodiment, a private session identifier may not be discoverable to other user devices 102 and/or Joeys 103 on the LAN 118 absent knowledge of the same and the providing of one or more credential, passcodes, or the like.

For at least one embodiment, the seamless engine 105 may be configured to facilitate public, seamless DVR sessions. For a public session, participation in the seamless DVR session may be unlimited and any user device 102 and/or Joey 103 having permission to join the LAN 118 may join in the session. For at least one embodiment, permission to join the LAN 118 may not be required. Accordingly, it is to be appreciated that a seamless DVR session may occur at any desired level of openness ranging from private to public.

For at least one embodiment, the seamless engine 105 may be configured to facilitate a seamless DVR session by designating a given user device 102 as a master for providing information available to form the session between two or more user devices 102 and/or with a Joey 103, and for reconfiguring other user devices 102, as needed, to facilitate such other user devices 102 and/or Joeys 103 joining and/or participating in one or more sessions.

For at least one embodiment, the seamless engine 105 may be configured to facilitate seamless DVR session formation and/or reconfiguration, by each user device 102 and Joey 103 configuring itself to periodically output one more "available" signals. The available signals may be used to identify a given user device 102 or Joey 103 as available on a given LAN 118 and as being available to participate in a given seamless DVR session. An available signal may designate a given session, a to be formed session, no session, or otherwise.

The seamless engine 105 may also be configured to facilitate designation of a given user device 102 as being (in)capable to operate, with respect to one or more sessions, in a master mode or a remote mode. For at least one embodiment and as defined herein, Joeys 103 are not configured to operate in a master mode or a remote mode. Such designations may vary over time and as use of a given user device 102 so varies. It is to be appreciated that a given user device 102 may not have the same capabilities as another user device, at any given time, or otherwise. For example, a first user device may be capable of recording, providing, and/or accessing 4K video signals while another user device is capable of recording, providing, and/or accessing video signals only up to 1080p. The seamless engine 105 may be configured to facilitate such designation and, in conjunction with other user devices 102 on a given LAN 118, allocate resources across the LAN 118 to facilitate one or more, if not all, the desired sessions—as subject to any and/or each user device, LAN, and other system constraints.

For at least one embodiment, the seamless engine 105 may be configured to facilitate a given seamless DVR session by recognizing capabilities of other user devices 102 participating in the given session, and/or on a given LAN 118, at a given time and/or at a future time, as may be needed with respect to recording of a given content in the future. The seamless engine 105 may be configured to facilitate adaptations to sessions as based upon then arising system 100 capabilities. For example, the entry or exit of one or more user devices 102 and/or Joeys 103 from the LAN 118 may require an adaptation in how sessions are executed, if executable.

DVR Manager (130)

For at least one embodiment, a seamless engine 105 may be configured to execute additional operations facilitating use of a DVR manager 130. For at least one embodiment, the DVR manager 130 may be configured to perform one or more of the operations described herein including, but not limited to, the operations described herein in conjunction with FIG. 3.

Tuner Manager (132)

For at least one embodiment, a seamless tuner engine 105 may be configured to execute operations for facilitating seamless use of tuners—as provided by multiple user devices 102 on a LAN 118. For at least one embodiment, the tuner manager 134 may be configured to perform one or more of the operations described in Seamless Tuners.

Timer Manger (134)

For at least one embodiment, a seamless engine 105 may be configured to execute additional operations facilitating use of a timer manager 132. The timer manager 132 may be executed in conjunction with and/or in support of a seamless engine including, but not limited to, those seamless engines taught by Seamless Timers.

Storage Module (106)

For at least one embodiment, a user device 102 may include one or more storage module(s) 106. Computer instructions, data sets and/or other information (collectively herein, "stored data") may be stored by such storage module(s) 106 and used by the processor 104 and/or other system hardware and/or software components to provide one or more features and/or capabilities of the various embodiments of the present disclosure. For example, the processor module 104 may be configured to execute, use, implement, modify, or otherwise process such stored data. It is to be appreciated that the storage module(s) 106 (each module and/or sub-division thereof a "storage component") may be configured using any known or later arising data storage technologies. In at least one embodiment, storage module(s) 106 may be configured using flash memory technologies, micro-SD card technology, as a solid-state drive, as a hard drive, as an array of storage devices, or otherwise. Storage module(s) 106 may be configured to have any desired data storage size, read/write speed, redundancy, or otherwise. A storage module 106 may be configured to provide temporary/transient and/or permanent/non-transient storage of stored data, as the case may be. Stored data may be encrypted prior to and/or at the time of storage, with decryption of such stored data occurring, as needed, for use by processing module, or otherwise.

Storage module(s) 106 may include one or more databases providing information, instructions and/or data for use in facilitating seamless DVR sessions, LAN formation and operation, and otherwise. For at least one embodiment, such databases may include one or more of a content database 107, a user database 109, a history database 111, a support database 113, an "other" database 115, a tuner database 117, and a timer database 119. Other databases may be used for other embodiments.

Content Database (107)

For at least one embodiment, a content database 107 may be configured to collect and provide access to content for use during one or more seamless DVR sessions. Content may be group, partitioned, or otherwise associated for use with and/or during a seamless DVR session automatically, based on user input, or otherwise. Non-limiting examples of the content database 107 are described below with reference to FIGS. 2A-2D. As discussed herein, a seamless DVR session may be specific to a given content, a given LAN, a given collection of user devices, or otherwise. For example, a seamless DVR session may be formed with respect to all content, where any user device participating in the seamless DVR session may access the content. For another embodiment, the content database may partition and/or identify content permissible to only those user devices meeting certain criteria. For at least one embodiment, the content database may be configured to categorize content based upon genre, rating, or other criteria.

Further, it is to be appreciated that seamless DVR sessions, as related to how content is stored, accessed or otherwise provided by a given user device 102, may be generalized and/or specified (to any level thereof or therebetween) to the extent that such content itself may be generalized and/or specified. For at least one embodiment, a seamless DVR session may be additionally, separately, and/or alternatively specific to a given group of user devices, such as user devices A, B and C. Such grouping of user devices with respect to a given seamless DVR session may, as desired, may be specific to a given LAN or otherwise. The content database 107 facilitates the storage of data related to seamless DVR sessions that the seamless engine 105 may utilize to facilitate formation, use, reconfiguration and/or demolition of a seamless DVR session.

User Database (109)

For at least one embodiment, information pertaining to a user and/or a population of users may be provided by a user database 109. The storage module 106 may be configured to collect and provide data relating to one more users and/or their preferences. The user preferences may include any information that may be and/or is useful in supporting one or more seamless DVR sessions. Non-limiting examples of such user preferences may include types of content a user prefers. The breadth and scope of such types of information, and the degree of specificity and/or anonymity and/or generality associated therewith, is not limited to, and may vary as desired with the providing, use, or otherwise of one or more seamless DVR sessions. Any source of information may be used in populating the user database 109. The user database 109 may be used by the seamless engine 105 of a first user device 102(A) in determining which stored content on a second user device 102(B) is to be presented as being accessible to a user of the first user device 102(A). For example, a user preference of sports related content, but not cooking related content, may result in a given seamless engine 105 providing a universal directory tailored to such user preferences by including sports related content stored on other user devices then on the LAN 118 and not presenting cooking related content stored on such other user devices.

For at least one embodiment, the user database 109 may be configured to provide information pertaining to capabilities of a given user device. Such capabilities information may include information regarding peripheral devices coupled to the user device 102, such as capabilities of a display device coupled to a given user device 102. Such information may be useful in determining which content to access and provide during a given seamless DVR session, in view of capabilities of a destination user device. In view of such capabilities, content that exceeds capabilities of a given user device may be not be presented, may be converted into a compatible format, or otherwise. Likewise, content that is of a lesser quality (such as, standard definition content) from a first source may not be provided for a given session when content of a higher quality (such as, high definition content) is available from another source. Other considerations may be used by a given user device's seamless engine 105, based upon information stored in the user database 109, in facilitating a seamless DVR session.

History Database (111)

For at least one embodiment, information pertaining to a history of seamless DVR sessions may be provided by a history database 111. The storage module 106 may be configured to collect and provide data relating to the use, construction of and deconstruction, as appropriate, of seamless DVR sessions by a given user device. For at least one embodiment, the history database may be configured to include one or more resume identifiers of a resume position at which presentation of a recorded title may be resumed. For at least one embodiment, such one or more resume identifiers may be specific to a use of a given user device, a given user, one or more identified users, all user devices on the LAN, or otherwise. For at least one embodiment, a resume identifier for a first STB may be used by a user of a second STB to resume presentation of a given title at the identified position therein. Data stored in the history database may be useful in facilitating the creation and/or use of future seamless DVR sessions, generating opportunities to monetize the promotion and/or advertising of content in conjunction with and/or in support or response to the use of seamless DVR sessions, and otherwise. The history database 111, for at least one embodiment, may include information obtained from the user database 109. Information provided by the history database 111 may be provided at any desired level of anonymity.

Support Database (113)

For at least one embodiment, a support database 113 may be configured to collect and provide data relating to one or more functions provided by a given user device 102 for use during a seamless DVR session and/or to facilitate formation, reconfiguration, and/or demolition of a seamless DVR session on one or more LANs 118. The support database 113 may be configured to provide support features, such as tutorials or the like, that provide support for formation of seamless DVR sessions and otherwise. Data provided in such a support database 113 may be used by a seamless engine 105.

Other Databases (115)

For at least one embodiment of the present disclosure, the storage module 106 may include the use, on a transient or non-transient basis, of other databases 115. The stored data in such other databases 115 being provided for execution and/or use, singularly or collectively, by the processor 104 and/or other components of a user device 102. Any type of stored data and associated computer instructions implemented for use of such stored data may be provided by the other databases 115 for use by a seamless engine 105 or otherwise.

Tuner Database (117)

For at least one embodiment, a tuner database 117 may be configured to collect information regarding tuners for use during one or more seamless tuner sessions. Such tuners may be grouped, designated, reserved, or otherwise associated for use with and/or during a seamless tuner session automatically, based on user input, or otherwise. Non-limiting examples of a tuner database 117 are further described in Seamless Tuners.

Timer Database (119)

For at least one embodiment, a timer database 119 may be configured to collect information regarding timers designating one or more future uses of one or more tuners. For at least one embodiment, such timers may designate one or more future arising seamless tuner sessions. Such timers may be grouped, designated, reserved, or otherwise associated for use with and/or during a seamless tuner session automatically, based on user input, or otherwise. Non-limiting examples of a timer database 119 are further described in Seamless Timers.

Security Module (108)

For at least one embodiment, a user device 102 and/or Joey 103 may separately or using computer instructions executed by the processor module 104 provide a security module 108. The security module 108 provides a user device 102 and/or Joey 103 with capabilities of securing user participation on a LAN 118 and with respect to one or more sessions. The security module 108 may be configured to address security needs, including but not limited to, securing the identity of user devices 102 and/or Joeys 103, securing content communicated via a given LAN 118 and for a given session, and other security needs. The security module 108 may operate separately and/or in conjunction with security components provided by other components of a user device 102, Joey 103, and/or the system 100 including those provided by servers 122, content sources 116, and otherwise. Any desired known or later arising security technologies, protocols, approaches, schemes, or otherwise may be used in one or more embodiments of the present disclosure by the security module 108.

Figure 2B:
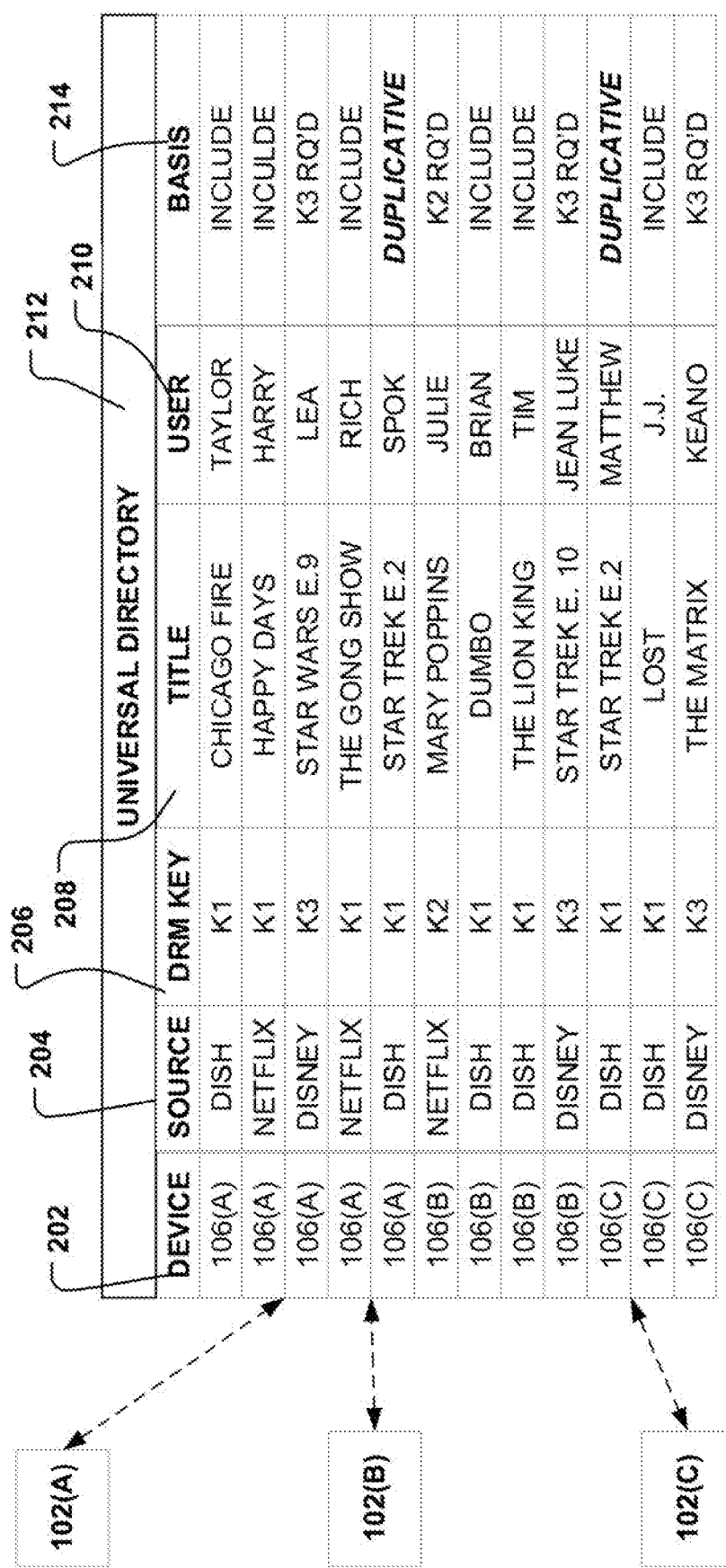
FIG. 2B is an illustrative representation of a universal directory populated in accordance with use of at least one embodiment of the present disclosure to facilitate seamless digital video recordings of content and use thereof across multiple devices within a local area network.
Figure 2C:
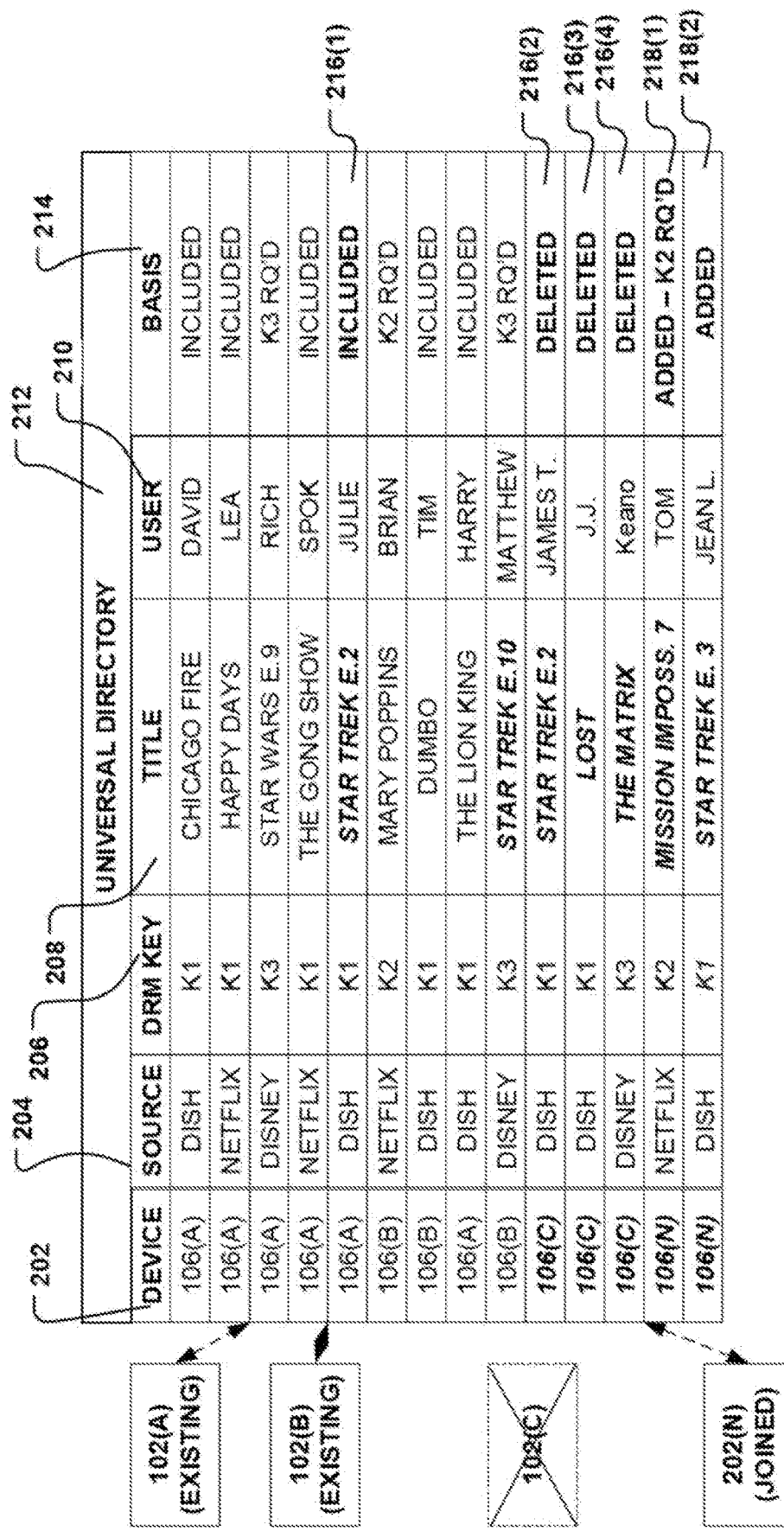
FIG. 2C is an illustrative representation of a universal directory re-populated in furtherance of an addition and/or deletion of a user device from a network of DVR devices and in accordance with use of at least one embodiment of the present disclosure to facilitate seamless digital video recordings of content and use thereof across multiple devices within a local area network.

For at least one embodiment, the security module 108 on one or more, if not each, user device 102 and Joey 103 participating on a given LAN 118 may be configured to utilize a common household DRM key. As shown in FIGS. 2A-2C, such common household key is identified herein as "K1." Such common household key may facilitate access to content stored, in encrypted form, on each of the user devices participating on the given LAN 118. For other embodiments, a unique DRM key may be required to access unique content. As shown in FIGS. 2A-2C, such unique DRM keys are identified herein as "K2" and "K3." Further, the security module 108 on each user device participating on a given LAN 118 may be configured to utilize other security keys, inter-device keys, for securing communications over the LAN 118. Such inter-device keys, may be based on any desired information, such as a customer billing number, a customer identifier, and/or other information, may be randomly generated, or otherwise. For at least one embodiment, as user devices join and/or leave a given LAN 118, one or more security keys may be dynamically adjusted, modified, or otherwise processed.

I/O Module(s) (110)

For at least one embodiment, user devices 102 and Joeys 103 may include one or more input/output ("I/O") module(s) 110. Such modules may include audio, visual, text, and/or gesture I/O module.

Audio I/O Module: Audio I/O modules may be configured to support the providing of audible signals between a user and a user device. Such audio signals may include spoken text, sounds, or any other audible information. Such audible information may include one or more of humanly perceptible audio signals, where humanly perceptible audio signals typically arise between 20 Hz and 20 KHz. For at least one embodiment, the range of humanly perceptible audio signals may be configurable to support an audible range of a given individual user.

For at least one embodiment, an audio I/O module generally includes hardware and software (herein, "audio technologies") which supports the input and (as desired) output of audible signals to a user. Such audible signals may include those arising from a given content. Such audio technologies may include technologies for converting human speech to text, text to speech, translation from a first language to one or more second languages, playback rate adjustment, playback frequency adjustment, volume adjustments and otherwise. Non-limiting examples of audio technologies that may be utilized in an audio I/O module include GOOGLE VOICE, SFTRANSCRIPTION, BRIGHTSCRIPT, GOOGLE ASSISTANT, SIRI, and others.

In at least one embodiment, an audio I/O module may be configured to use one or more microphones and speakers to capture and present audible information to a user. Such one or more microphones and speakers may be provided by a given user device 102 and/or Joey 103 itself or by a device communicatively coupled additional audible device component, for example, by earbuds may be communicatively coupled to a smartphone, with the earbuds functioning as an audio I/O module and capturing and presenting audio sounds to and from a user, while the smartphone functions as a user device 102 and/or Joey 103. Accordingly, it is to be appreciated that any existing or future arising audio I/O devices, systems and/or components may be utilized by and/or in conjunction with a user device 102 and/or Joey 103 to facilitate one or more embodiments of the present disclosure.

Visual I/O Module: For at least one embodiment, user devices 102 and Joeys 103 may include a visual I/O module configured to support the providing of visible signals between a user and a user device 102 or Joey 103. Such visible signals may be in any desired form, such as still images, motion images, augmented reality images, virtual reality images and otherwise. Such visible information may include one or more of humanly perceptible visible signals. For at least one embodiment, a visual I/O module may also be configured to capture non-humanly visible images, such as those arising in the X-ray, ultra-violet, infra-red or other spectrum ranges. Such non-humanly visible images may be converted, as desired, into humanly visibly perceptible images by a user device.

For at least one embodiment, a visual I/O module generally includes hardware and software (herein, "visible technologies") which supports the input by and (as desired) output of visible signals to a user. Such visible signals may include those arising from a given content. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O module may be configured to use one or more display devices configured to present visible information to user. A visual I/O module may be configured to use one or more image capture devices, such as those provided by lenses, digital image capture and processing software and the like which may be provided by a given user device 102 or Joey 103 itself or by a communicatively coupled additional image capture device component, for example, a remote camera in a vehicle or otherwise. Accordingly, it is to be appreciated that any existing or future arising visual I/O devices, systems and/or components may be utilized by and/or in conjunction with a user device 102 or Joey 103 to facilitate one or more embodiments of the present disclosure.

Text I/O Module: For at least one embodiment, user devices and Joeys 103 may include a text I/O module configured to support the providing of textual information by a user using a user device 102 or Joey 103. Such textual information signals may be in any desired language, format, character set, or otherwise. Such textual information may include one or more of humanly perceptible characters, such as letters of the alphabet or otherwise. For at least one embodiment, a text I/O module may also be configured to capture textual information in first form, such as a first language, and convert such textual information into a second form, such as a second language. A text I/O module generally includes hardware and software (herein, "textual technologies") which supports the input by and (as desired) output of textual information signals to a user. In at least one embodiment, a text I/O module may be configured to use an input device, such as a keyboard, touch pad, mouse, or other device to capture textual information. It is to be appreciated that any existing or future arising text I/O devices, systems and/or components may be utilized by and/or in conjunction with one or more embodiments of the present disclosure.

Gesture I/O Module: For at least one embodiment, user devices 102 and Joeys 103 may include a gesture I/O module configured to support the providing of gesture information, such as sign language, by a user using a user device 102 or Joey 103. Such gesture information signals may be in any desired form or format. Such gesture information may include one or more of humanly perceptible characters, such as those provided by sign language. For at least one embodiment, a gesture I/O module may also be configured to capture a user's motions to control one or more aspects of a user device 102 or Joey 103; non-limiting examples of such motions including those commonly used on smartphone touch interfaces. A gesture I/O module generally includes hardware and software (herein, "gesture technologies") which supports the input by and (as desired) output of gesture information signals to a user. Such gesture technologies may include technologies for inputting, outputting, and converting gesture content into any given form, such as into textual information, audible information, visual information, device instructions or otherwise. In at least one embodiment, a gesture I/O module may be configured to use an input device, such as a motion detecting camera, touch pad, mouse, motion sensors, or other devices configured to capture motion information. It is to be appreciated that any existing or future arising gesture I/O devices, systems and/or components may be utilized by and/or in conjunction with a user device 102 or Joey 103 to facilitate the use of gesture information in furtherance of one or more seamless DVR sessions.

Interface Module (112)

As further shown in FIG. 1 and for at least one embodiment of the present disclosure, user devices 102 and Joeys 103 may include an interface module 112. The interface module 112 may include one or more components for use in forming a LAN 118 and facilitating one or more sessions. The interface module 112 may use any known or later arising technologies; non-limiting examples including hardware and software configured for use with one or more of the BLUETOOTH™, ZIGBEE™, Near Field Communications, Narrowband IOT, WIFI™, 3G, 4G, 5G, cellular, and other currently arising and/or future arising communications technologies. Any known or later arising networking and/or other communications technologies may be used to facilitate communications between user devices 102 and/or Joeys 103 over a LAN 118. For at least one embodiment, communications technologies for a given internal link 124 between a given user device 102, Joey 103, and a LAN 118 may vary by each link used. The interface 112, in conjunction with the seamless engine 105 may be configured to adapt to link types used based upon seamless DVR session then in use, and otherwise.

For at least one embodiment, the interface module 112 may be configured to include one or more data ports for establishing connections between a user device 102 and/or a Joey 103 with a LAN 118. Such data ports may support any known or later arising technologies, such as USB 2.0™, USB 3.0™, ETHERNET™, FIREWIRE™, HDMI™, wireless technologies, and others. The interface module 112 may be configured to support the transfer of data formatted using any desired protocol and at any desired data rates/speeds between user devices 102 and Joeys 103 over the LAN 118. The interface module 112 may be connected to one or more antennas (not shown) to facilitate wireless data transfers. Such antenna may support short-range technologies, such as 802.11a/c/g/n and others, and/or long-range technologies, such as 4G, 5G, and others.

Receiver Module (112)

For at least one embodiment, a user device 102 may include a receiver module 112 configured to request and/or receive content from one or more content sources 116. Receiver modules 112 are well known in the art and are not further described herein.

As shown in FIG. 2A and as discussed above, each user device 102 participating in a LAN 118 may include a storage module 106 that is populated with one or more instances of content. Such content may be further identified in the content database 107 by one or more directories, such as a device A directory 202(A), a device B directory 202(B), and a device C directory 202(C). For at least one embodiment, a device directory may be configured to further identify content stored on an associated storage module in conjunction with one or more identifying data, as available/applicable for a given content. Non-limiting examples of such identifying data, as shown in FIG. 2, may include designations of a source 204, a DRM key 206, a title 208, and a user 210 identifying a given user who designated the content to be recorded. Other designators, not shown, may be used; non-limiting examples including format, bit rate, size, date of recording, expiration date, and otherwise.

As shown in FIG. 2B and for at least one embodiment, when a LAN 118 is being formed and/or reconfigured, a universal directory 212 may be populated, based upon content identified in each of the user devices participating then on a given LAN. As shown in FIG. 2B, the universal directory 212 is populated, at a given time, based upon the participation of each of the first user device 102(A), the second user device 102(B), and the third user device 102(C) on the given LAN 118. As shown, information available from each of these user device directories 202(A)/202(B)/202(C) (as shown in FIG. 2A) is used to populate the universal directory 212.

For at least one embodiment, the seamless engine 105 executing in each user device 102 may populate their own instance of the universal directory 212. For another embodiment, the universal directory 112 may be populated by a user device 102 operating as a master or a given session and then communicated to each other user device participating on a LAN 118. As shown, the universal directory 212 may include the source 204, DRM key 206, title 208, and user identifiers 210 (and any other desired identifiers). The universal directory 212 may also be configured to include, for at least one embodiment, an identifier 202 of the user device at which the given content is stored, and basis 214 identifier. For at least one embodiment, the seamless engine 105 populating a given universal directory 212 may be configured to include in the basis 214 field, an indication of whether a given content is to be identified, to a user of a given user device, in a universal directory accessible by such user(s) of the given user device. As shown, basis identifiers may include, but are not limited to, "include" (designating a given content to be identified on a given universal directory), "Key #RQ'D" identifying whether a given DRM key is required (where a universal directory for those user devices, if any, not having access to a required DRM key are populated accordingly, such as by not including a listing of the DRM key controlled content, providing a link to obtain a given DRM key, or otherwise), "duplicative" (identifying a given content as being accessible from two or more storage modules, and otherwise.

As shown in FIG. 2C and for at least one embodiment of the present disclosure, the universal directory 212 may be dynamically updated as user devices 102 join and/or leave a given LAN 118. As shown, when the third user device 102(C) leaves the LAN 118, the status of one or more content entries in the universal directory 212 may be updated. As shown, the status 216(1) of Star Trek E.2 may be updated to "included" from its prior "duplicative" setting, while content previously accessible solely from the third user device 102(C) may be deleted from the directory, as indicated by 216(2)/(3)/(4). Similarly, when an n'th user device 102(N) joins the LAN 118, the universal directory 212 may be updated, as identified by 218(1)/(2), to show the addition of new content and any key requirements associated with such new content.

For at least one embodiment, when a user device 102 is added or deleted from a LAN 118 a discovery process for content available across all user devices 102 on the LAN 118 may be initiated. Such discovery process may be facilitated by each user device 102 reporting to other user devices 102 on the LAN only the content that is stored on its storage module 108 and not content identified on the universal directory.

For at least one embodiment, a universal directory may be updated on a periodic or other basis. For example, every fifteen minutes, each user device 102 on a given LAN 118 may communicate an identifier of content stored thereon to each other user device 102 on that given LAN 118. Such identifier may include a minimum amount of information necessary to uniquely identify a given content. Based upon such unique identifiers, receiving user devices 102 may request additional information to populate an instance of the universal directory, as provided by that user device 102. Such additional information may include any other information desired including, but not limited to, source, DRM Key, title, user and otherwise. Further, in populating a universal directory, a given seamless engine 105 executing on a given user device 102 may populate such universal directory in view of user preferences, history, and/or other information.

As shown in FIG. 2D, a universal directory may be further configured to include a "status" field 220. The status field may indicate a current status of a given content, such as whether it is "available" 222(1), being then played by another user device 222(2), whether a DRM key limit as has been exceeded and the content is, thus, not available until the limit is no longer exceeded 222(3), and whether a DRM key can be obtained 222(4) such as by use of a hyperlink or the like. Other status indicators may be used for one or more embodiments. For at least one embodiment, the status indicators may dictate what actions a given user device 102 or Joey 103 may or may not take with respect to a given content. For example, when a given content, such as an episode of HAPPY DAYS is being obtained the first storage module 106(A), on the first user device 102(A), and played on the second user device 102(B), the first user device 102(A) may be prohibited and/or issued a warning before such HAPPY DAYS episode may be deleted, or otherwise changed, by the first storage module 106(A).

Similarly and for at least one embodiment, a playing of a given content on a source thereof may result in one or more seamless engines, executing on other user devices 102, being prohibited, restricted, pre-warned, or otherwise configured from taking, deferring, delaying or other actions which may impact the presentation of such content on a source user device 102, a Joey 103, or otherwise. Other considerations may be provided, with various rules and procedures being set forth and executed by the respective seamless engines executing in a given mode, such as the master, remote, and Joey modes, on each user device 102 or Joey 103 (as appropriate) on a given LAN 118.

For at least one embodiment, a universal directory status field may also be populated by a seamless engine 105 to designate whether another user device 102 and/or system resource is needed to record and/or play a given content. For example and not by limitation, a status indicator of "Receiver Rq'd" 222(5) may be populated when a second user device 102(B), already playing a first content, desires to play a second content, but, lacks a receiver, or other component, needed to play a given content. It is to be updated, that such status field, and other fields on a universal directory and/or on a device directory (as shown in FIG. 2A) may be updated while a user input device, such as a cursor hovers or otherwise selects or indicates interest in a given content. Thus, a content status may dynamically change based upon use thereof by one or more user devices 102 on a given LAN 118 and user interest therein, with respect to a given user device 102. Such status indicators may also be populated with respect to peripherals needed, such as display devices, capabilities thereof, and otherwise.

Figure 3:
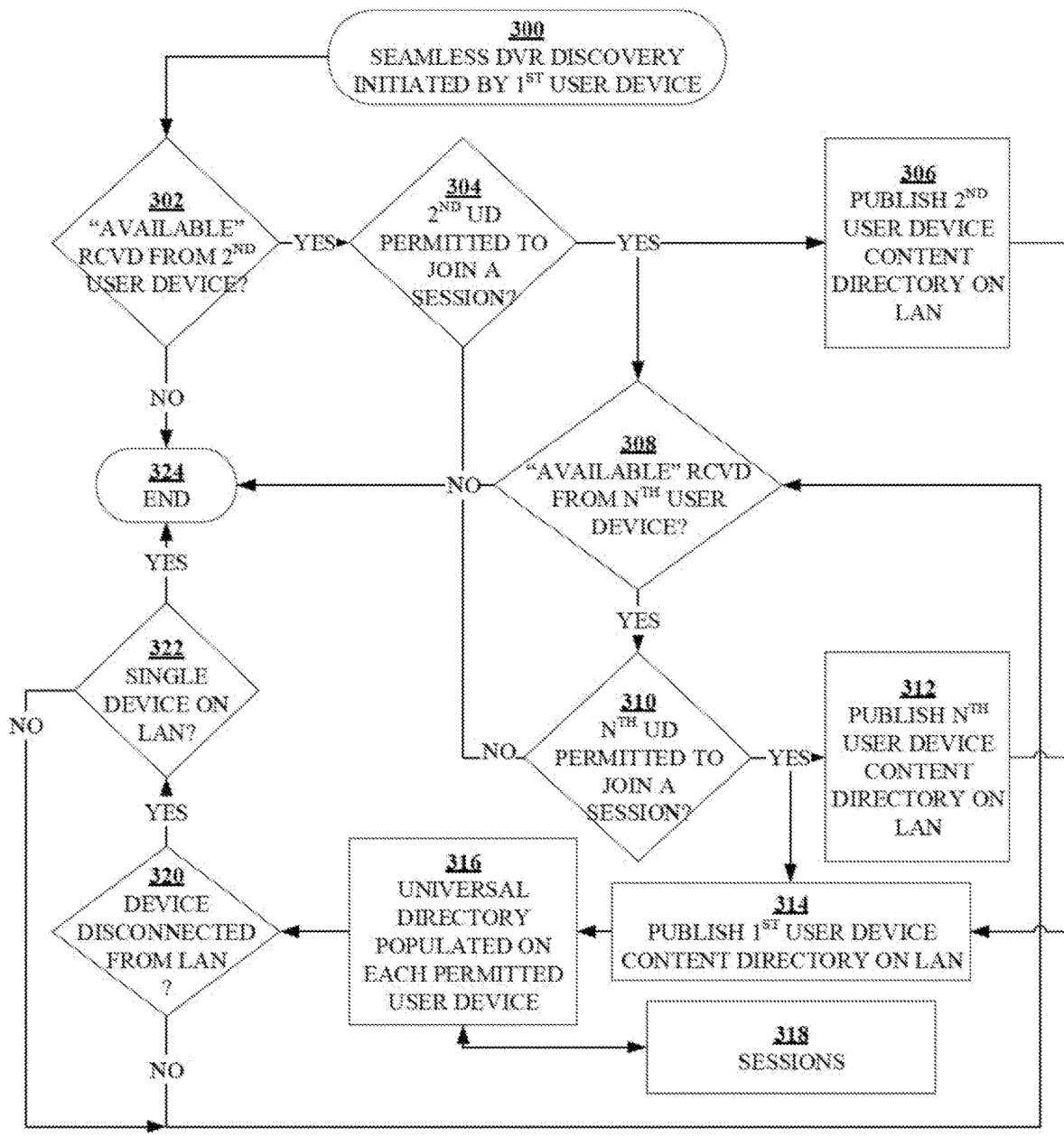
FIG. 3 is a flowchart illustrating a process for facilitating seamless DVR recording of content and use thereof within a local area network and in accordance with at least one embodiment of the present disclosure.

In FIG. 3 and for at least one embodiment of the present disclosure, a process for facilitating DVR recording of content and use thereof within a given LAN is shown.

Per Operation 300, the process may begin with a user device 102 connecting to a router or similar device and initiating a seamless DVR discovery process. The discovery process may include the first user device 102(A) broadcasting an "available" signal on a LAN 118 to which the first user device 102(A) has already been connected. The connecting of the first user device 102(A) to the LAN 118 may use any known or later arising device to LAN connection technologies, protocols, or the like.

Per Operation 302, the process may include awaiting, by the first user device 102(A) for a corresponding "available" signal from a second user device 102(B). For purposes of this discussion, a second user device 102(B) is presumed to already be connected to the LAN 118, with such connection using any known or later arising device to LAN connection technologies, protocols, or the like. For at least one embodiment, the second user device 102(B) may be required to provide an available signal within a predetermined, then determined, or otherwise determined period. If "yes," the process may proceed to Operation 304. If "no," the process may end, as per Operation 324.

Per Operation 304 and when an available signal is received from a second user device 102(B) on the LAN 118, the process may include determining whether the second user device (UD) is permitted to join a session. As discussed above, a session arises with respect to a given content between a source of such content and a destination for the given content. At this point of the process, the determination may be made as to whether any session, for any content provided by the first user device 102(A) can be accessed by the second user device 102(B). If "yes", the process may proceed to Operation 306 and to Operation 308. If "no," the process may end, as per Operation 324.

Per Operation 306, the process may include the second user device publishing on the LAN 118 to, at least the first user device 102(A), a second user device content directory, such as a content directory shown in FIG. 2A. It is to be appreciated that any device may be designated to publish, on the LAN 118, their respective content directory to any other user device and/or all user devices on the LAN 118, at any given time. Accordingly, Operation 306 may arise at any time and the various embodiments are not to be construed as requiring any given user device to publish its content directory, first, last, or otherwise. For at least one embodiment, each user device 102 on the LAN 118 and permitted to participate in at least one session may publish its content directory at substantially the same time, periodically, or otherwise. As further shown, the process may proceed in parallel to Operations 308 and to Operation 314, each discussed in greater below.

Per Operation 308, the process may include awaiting for another "available" signal from another user device 102, e.g., a third user device 102(C), a fourth user device 102(D), an Nth user device 102(N), or a Joey 103, connected to the LAN 118. It is to be appreciated that for at least one embodiment, each user device 102 and/or Joey 103 on a given LAN 118 may be aware of the presence of other user devices 102 and/or Joeys 103 on that LAN 118. Known network discovery processes may be used, as desired for any given embodiment. Accordingly, Operation 308 may be configured to await "available" signals from each other known user device 102 and/or Joey 103 on the LAN 118, from one or more designated user devices 102, or otherwise. Further, any desired period of time may be used to await receipt of "available" signals from third and/or other user devices 102 and/or Joeys 103 on the LAN 118. Further, "available" signals from other user devices 102 and/or Joeys 103 may be communicated at any time, in parallel, or otherwise. If "yes," the process may proceed to Operation 310. If "no," the process, with respect to any third to nth user devices may end, as per Operation 324. It is to be appreciated that the process may continue, otherwise, with respect to those user devices communicating an "available" signal.

Per Operation 310, and when an available signal is received from each of a third to Nth user device 102(C)-102(N) on the LAN 118, the process may include determining whether such third to Nth user device 102 and/or Joey 103 is permitted to join a session. It is to be appreciated that a number of determinations to be made per Operation 310 may vary based on the number of user devices/Joeys "available" and already permitted to join a session, the number of content instances available across the available user devices 102, any content restrictions applicable, and otherwise. For at least one embodiment, an iterative approach may be used to determine whether a given user device 102 or Joey 103 is permitted to join one or more sessions on the given LAN 118. If "yes", the process may proceed to Operation 312 and to Operation 314. If "no," the process may end, as per Operation 324.

Per Operation 312, the process may include the respective permitted third to Nth user device(s) publishing on the LAN 118 to, at least the first user device 102(A), and the already permitted second user device 102(B), a third to Nth user device content directory, such as a content directory shown in FIG. 2A. Again, any user device may be designated to publish, on the LAN 118, their respective content directory to any one or more other user devices 102 or Joeys 103 and/or to all user devices 102 and Joeys 103 on the LAN 118, at any given time. Accordingly, Operation 312 may arise at any time and the various embodiments are not to be construed as requiring any given user device 102 to publish its content directory, first, last, or otherwise. For at least one embodiment, each user device 102 on the LAN 118 and permitted to participate in at least one session may publish its content directory at substantially the same time, periodically, in response to new user devices 102 and/or Joeys 103 becoming available, in response to existing permitted user devices no longer being available, or otherwise. As further shown, the process may proceed to Operation 314.

Per Operation 314, the process may include the first user device 102(A) publishing its content directory on the LAN 118. As discussed above, this Operation may occur at any time, may occur with respect to all user devices 102, newly available and permitted user devices 102, and/or otherwise.

Per Operation 316, the process may include each user device 102 populating a universal directory for use thereby. The process may include updating one or more universal directories on one or more user devices 102. As discussed above, a universal directory may be updated on any basis.

Per Operation 318, the process may include executing and conducting one or more sessions. As discussed above, a session involves a source user device 102 providing access to content and/or device components/resources to at least one destination/remote user device 102 and/or Joey 103 over the LAN 118.

Per Operation 320, the process may include periodically determining whether a previously permitted user device 102 and/or Joey 103 has become unpermitted, unavailable, or otherwise disconnected from the LAN 118. It is to be appreciated that such determination may occur on any basis. For at least one embodiment, permitted devices may be configured to periodically provide status updates to other user devices 102 and Joeys 103 on the LAN 118. Such status updates may include identifications of new content on a given user device 102 or otherwise.

Per Operation 322, the process may include periodically determining whether only a single user device 102 is available and permitted to participate in a session on the LAN 118. If so, the process may end per Operation 324.

Per Operation 324, the process may end, as per one of the conditions identified above being satisfied or otherwise.

It is to be appreciated that the process flow shown in FIG. 3 and discussed above is for illustrative purposes only and is not to be considered limiting an embodiment of the present disclosure or an implementation thereof to any specific sequence of operations.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently and/or may be updateable, but, are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A system, comprising:
   a first user device communicatively coupled to a local area network; and
     wherein the first user device comprises a first hardware processor configured to execute first, non-transient, computer instructions for facilitating a first seamless DVR engine;
     wherein the first seamless DVR engine is configured to identify a first content;
   a second user device communicatively coupled to the local area network;
     wherein the second user device comprises a second hardware processor configured to execute second, non-transient, computer instructions for facilitating a second seamless DVR engine;
     wherein the second seamless DVR engine is configured to identify a second content; and
   wherein the first seamless DVR engine is configured to generate a first common universal directory;
   wherein the second seamless DVR engine is configured to generate a second common universal directory; and
   wherein each of the first common universal directory and the second common universal directory identify each of the first content and the second content as being available for use by each of the first user device and the second user device.

2. The system of claim 1,
   wherein the first user device is configured to independently populate the first common universal directory; and
   wherein the second user device is configured to independently populate the second common universal directory.

3. The system of claim 1, further comprising:
   a third user device communicatively coupled to the local area network;
     wherein the third user device comprises a third hardware processor configured to execute third, non-transient, computer instructions for facilitating a third seamless DVR engine;
     wherein the third seamless DVR engine is configured to identify a third content; and
   wherein each of the first common universal directory and the second common universal directory identify the third content as being available for use by at least one of the first user device and the second user device.

4. The system of claim 3,
   wherein the first common universal directory identifies a distinct status for the first content.

5. The system of claim 4,
wherein the distinct status comprises one of playing on the first user device, playing on the second user device, and playing on the third user device.

6. The system of claim 5,
wherein the first computer instructions inhibit deletion of the first content when the distinct status is one of playing on the second user device and playing on the third user device.

7. The system of claim 1,
wherein the first user device further comprises:
a first storage module further comprising:
a first content database configured to store the first content;
wherein the first content is identifiable by a first title;
wherein the second user device further comprises:
a second storage module further comprising:
a second content database configured to store the second content;
wherein the second content is identifiable by a second title; and
wherein each of the first common universal directory and the second common universal directory identify each of the first content and the second content, respectively, by the first title and the second title; and
wherein each of the first common universal directory and the second common universal directory are unique combinations of content.

8. The system of claim 1,
wherein use of the first content and the second content, by one or more of the first user device and the second user device, requires access to a common DRM key.

9. The system of claim 8,
wherein the common DRM key is a household key; and
wherein each of the first user device and the second user device are associated with a given household.

10. The system of claim 1,
wherein the first user device further comprises:
a first receiver module configured to receive the first content from a first content source; and
wherein the first content source is at least one of a cable, satellite, Internet, streaming, over the air, and an over the top content source.

11. The system of claim 1,
wherein the first user device further comprises:
a first storage module configured to store information in at least one of a content database, a user database, a history database, and a support database; and
wherein the first computer instructions instruct the first seamless DVR engine to populate a first universal directory, based on the common universal directory, in view of a user preference provided in the user database.

12. The system of claim 11,
wherein the user preference indicates a preference, by a first user, for sporting event related content; and
wherein the first seamless DVR engine populates the first common universal directory by including sporting event related content and excluding non-sporting event related content.

13. A process, for seamless digital video recording and use of content across multiple devices within a local area network, comprising:
initiating by a first user device on a local area network (LAN) a discovery for available devices;
receiving, from a second user device on the LAN an available signal response;
determining whether the second user device is permitted to participate in a session;
wherein a session is a sharing of DVR content by a source user device with a destination user device;
if the second user device is permitted to participate in a session,
publishing, by the second user device, a second content directory on the LAN;
publishing, by the first user device, a first content directory on the LAN; and
generating a first instance and a second instance of a common universal directory based on content identified in the published first content directory and in the published second content directory.

14. The process of claim 13, further comprising:
launching and conducting a session by providing access by the source user device to the destination user device; and
wherein the source user device is one of the first user device and the second user device and the destination user device is the respective opposite of the first user device and the second user device.

15. The process of claim 13,
wherein the first instance and the second instance of the common universal directory are generated separately and respectively by each of the first user device and the second user device.

16. The process of claim 13, further comprising:
receiving, from a third user device on the LAN another available signal response;
determining whether the third user device is permitted to participate in the session;
if the third user device is permitted to participate in the session, publishing, by the third user device, a third content directory on the LAN;
publishing, by the first user device, a republished first content directory on the LAN;
publishing, by the second user device, a republished second content directory on the LAN; and
generating respective new instances of a second common universal directory based on content identified in the republished first content directory, in the republished second content directory, and in the third content directory.

17. The process of claim 16, further comprising:
wherein the republished first content directory differs from the first content directory.

18. The process of claim 17, further comprising:
determining whether at least two of the first user device, the second user device and the third user device are permitted to participate in a second session.

19. A user device, configured for use in facilitating seamless DVR recording and use of content across multiple devices within a local area network, comprising:
a hardware processor configured to execute non-transient computer instructions for facilitating a seamless DVR engine;
a storage module for storing content;
an interface module configured to communicatively couple the user device with a second user device over a local area network (LAN);
a security module configured for use in encrypting and decrypting the content and securely communicating the content, in an encrypted form, to the second user device; and
a receiver module for receiving the content from a content source;

wherein the seamless DVR engine facilitates operations comprising:
- generating, by the first user device, a first instance of a common universal directory;
- generating, by the second user device, a second instance of a common universal directory;
  - wherein each of the first instance and the second instance of the common universal directory respectively identifies to the first user device and the second user device the stored content on the first user device and on the second user device; and
- establishing a session between the first user device and the second user device, via the LAN;
  - wherein, during the session,
    - the first user device can access content stored on each of the first user device and on the second user device, as such content is identified by the first instance of the common universal directory;
    - the second user device can access the content stored on each of the first user device and on the second user device, as such content is identified by the second instance of the common universal directory.

20. The user device of claim 19,
wherein the storage module further comprises a first user database;
wherein during a second session, the first user device populates the first instance of the common universal directory based upon each of a second content stored on the second user device and at least one user preference provided in the first user database.

* * * * *